(12) United States Patent
Bernadett et al.

(10) Patent No.: US 6,349,330 B1
(45) Date of Patent: Feb. 19, 2002

(54) METHOD AND APPPARATUS FOR GENERATING A COMPACT POST-DIAGNOSTIC CASE RECORD FOR BROWSING AND DIAGNOSTIC VIEWING

(75) Inventors: Michael J. Bernadett, Nevada City; Michael Castorino, Grass Valley; Sharon Dilorenzo, Nevada City; Nancy Fee, Grass Valley; George Foster; Irene Martin, both of Nevada City; James Michener, Grass Valley; David Wallace, Nevada City, all of CA (US)

(73) Assignee: Eigden Video, Nevada City, CA (US)

( * ) Notice: Subject to any disclaimer, the term of this patent is extended or adjusted under 35 U.S.C. 154(b) by 0 days.

(21) Appl. No.: 09/186,217

(22) Filed: Nov. 3, 1998

Related U.S. Application Data

(60) Provisional application No. 60/064,817, filed on Nov. 7, 1997.

(51) Int. Cl.[7] .............................................. G06F 15/16
(52) U.S. Cl. ........................ 709/219; 382/128; 709/218
(58) Field of Search .............................. 709/231, 246, 709/247, 217, 218, 219; 705/2, 3; 128/904, 920; 345/115, 424, 158; 351/212; 382/128, 299, 232, 244

(56) References Cited

U.S. PATENT DOCUMENTS

| 5,533,085 A | * | 7/1996 | Sheehan et al. ............... 378/95 |
| 5,715,823 A | * | 2/1998 | Wood et al. ............. 128/904 X |
| 5,940,802 A | * | 8/1999 | Hildebrand et al. ............ 705/3 |
| 5,986,662 A | * | 11/1999 | Argiro et al. ................ 345/424 |
| 5,993,001 A | * | 11/1999 | Bursell et al. ............... 351/212 |
| 6,018,713 A | * | 1/2000 | Coli et al. ....................... 705/2 |
| 6,031,516 A | * | 2/2000 | Leiper ......................... 345/115 |
| 6,032,678 A | * | 3/2000 | Rottem ........................ 128/920 |
| 6,115,486 A | * | 9/2000 | Cantoni ....................... 382/128 |

OTHER PUBLICATIONS

George J. Grevera et al., A WWW to DICOM Interface, Medical Informatics Group (MIG), Department of Radiology, Hospital of University of Pennsylvania, Mar. 1996, 9 pages.*
Stefan Schmid, Web Representation with Dynamic Thumbnails, Department of Distributed Systems, Univeristy of Ulm, Germany, Jun. 1998, 26 pages.*

* cited by examiner

*Primary Examiner*—Patrice Winder
(74) *Attorney, Agent, or Firm*—Gray Cary Ware & Freidenrich LLP

(57) ABSTRACT

Server accessible case records are generated for post-diagnostic and remote access viewing. First, a master sequence of digital video images is recorded. Next, a post-diagnostic case record is generated including a sequence of thumbnail images and a single lossless still image selected from the master sequence of images. The images of the post-diagnostic case record are formatted to be accessible by a browser over a dial-up connection. Each image of the sequence of thumbnail images includes a selection of interior pixels of one of the digital video images of the master sequence. The sequence of thumbnail images is a selection of consecutive images from the master sequence. The post-diagnostic case record and the master sequence are then stored on an image server. The master sequence is archived onto a secondary archive medium after a predetermined time.

38 Claims, 1 Drawing Sheet

METHOD AND APPPARATUS FOR GENERATING A COMPACT POST-DIAGNOSTIC CASE RECORD FOR BROWSING AND DIAGNOSTIC VIEWING

This application claims the benefit of U.S. Provisional Patent Application No. 60/064,817, filed Nov. 7, 1997.

This application is submitted with a computer program listing appendix on a compact disc containing copyrighted material. The appendix consists of one compact disc with 5 files entitled:

getimage.txt (text file) 13 KB Created: Dec. 21, 2000 agecases.txt (text file) 31 KB Created: Dec. 21, 2000 compress.txt (text file) 36 KB Created: Dec. 21, 2000 savegs.txt (text file) 4 KB Created: Dec. 21, 2000 showgs.txt (text file) 8 KB Created: Dec. 21, 2000

The contents of the compact disc are incorporated herein by reference. A duplicate copy of the compact disc was filed. The copyright owner has no objection to the facsimile production by anyone of the patent document or the patent disclosure, as it appears in the Patent and Trademark Office patent file or records, or otherwise reserves all copyright rights whatsoever in the appendix.

FIELD OF THE INVENTION

The present invention relates to the recording, storing, viewing and archiving of digital images, and more particularly, to converting digital images into dynamic video and HTTP formats to develop a server accessible case record including a dynamic video series of images and a lossless still image, and archiving in a timely manner the complete image data for a case.

BACKGROUND

Graphic images can generally be stored on magnetic media and magneto-optical disks, or CD-Roms. Graphic images are stored in two general formats, JPEG and GIF.

JPEG is a graphics format with suffix ".jpg" while the other popular graphics format is graphical interchange format (GIF) graphics with suffix ".gif." GIF is the most widely used graphics type. However, an advantage of JPEG is that it offers a higher degree of compression, allowing graphics files to occupy less disk storage space, i.e., fewer databits, than GIF, and consequently so that a picture or graphics file stored using JPEG can be transmitted faster.

Compression programs (e.g., Winzip for Windows and Stuffit Expander for Mac) utilize repetitiveness in data files to substitute simple symbolic representations for larger data strings each time the data strings appear. Decompression programs later restore the data back to full form by re-substituting the data strings for their simple symbolic representations.

Many images can be JPEG compressed to as much as 10:1 without undue distortion of the image. The amount of tolerable compression that an image can withstand generally depends on the complexity of the image. If the image has large areas of nonvariant or periodic chromatic integrity, then the image may be compressed a great deal. If the image is a random sea of static image, then no compression is possible, if the goal is to achieve a resulting "lossless" image. A lossless image is one whose resolution is not diminished by compression.

As a simple example, if an image has at least 4 contiguous pixels per localized color unit, then a 4:1 compression will not alter the resolution of the image at all, rendering it lossless, and yet the 4:1 compression will reduce transfer times to almost ¼ of their uncompressed times. Higher compression will render the resulting image at least fractionally "lossy" but will nevertheless often be desirable to minimize memory storage space usage and data transfer times. An appropriate balance must be carefully determined by a user, with shorter transfer times and lower usage of storage space advantages on one side, and clearer resolution on the other.

Plug-ins, usually having the .DLL (dynamic link library) suffix, are often used to facilitate browser access capabilities. Plug-ins enhance a browser's ability to access data and media of different types and come in many varieties. Common browsers utilize many plug-ins seamlessly to increase web data and media type access. Plug-ins often allow web pages to assimilate video and audio, thus allowing web pages to have multimedia prowess. Common plug-ins for web browsers include Netscape's LiveVideo and LiveAudio, Macromedia's director, Adobe's Acrobat and Apple's QuickTime.

A CGI (Common Gateway Interface) script is a program that is run on a web server, usually linking the server with another program running on the system such as a database. Typically, a browser requests a URL, which is the script, from the server which executes the script. The script then operates and passes output from other programs back to the server which passes the information back to the browser. Note that CGI scripts can be other than scripts. They can be, e.g., batch files or other executable programs A server typically has a finite amount of "on-line" image storage space. It is thus often necessary to use "off-line" or "near-line" storage for image archiving. Problematically, images archived to off-line or near-line storage are not as readily accessible in real time as those stored on an image server.

An important practical area for minimizing the storage requirements for lossless images is in angiography, or cardiac imaging. From an angiogram, a doctor can tell whether abnormal blood flow is occurring within the patient's heart. Angiograms are especially useful when electrocardiograms, computed tomography (CT), nuclear magnetic resonance (NMR) and other non-invasive techniques fail to reveal critical information required for proper diagnosis.

Cardiac images are often stored using Dicomed format, and specifically, ACC/ACR-NEMA DICOM 3.0 exchange media CD-Rom format. These images can be stored as lossless JPEG images with approximately 2:1 compression ratio and a resolution of 512×512.

A Thumbnail image is a single frame inline GIF or JPEG, which is taken from the middle of a sequence of images. The Dicom format includes single image 128×128 or 256×256 thumbnails taken from the middle of a sequence of 521×512 resolution, 2:1 compression JPEG images.

A number of products have implemented a mixture of compression techniques and display mechanisms to reduce the bandwidth and storage requirements for video images. Eigen Dualpath (R) has matched the speed of read/write optical drives and JPEG compression as a means to give real time, 1024×512 pixel dynamic review of cases off of slow media. Philips has produced a modification of the Dicom 3.0 XA standard, adding a lossy, compressed JPEG that would enable real time 521×512 pixel images from a CD-Rom format.

A problem with existing technology is that Dicomed formatted images are only conventionally convertible into single frame thumbnail images of 128×128 resolution. The single frame image can only yield static information concerning blood flow and cardiovascular blockage. Dynamic imaging, on the other hand, would provide insight into interrelationships within the heart including those of heart rate and blood flow velocity, flow paths and associated flow inhibitors, and cardio-irregularities and manifestations thereof. Dynamic Dicom-formatted images are not currently accessible via conventional internet browsers, with or without their plug-in companions.

Another problem with existing technology is its inability to retrieve single lossless images from Dicom 3.0 records and present them to a standard "off the shelf" internet browser. Conventional technology does not provide an HTTP or internet protocol to interface with Dicom 3.0 XA image records. This means that a remote cardiologist cannot perform analysis of cardiac images and angiograms by selecting a Dicomed image and converting it in real time for viewing via an internet browser. The use of a browser interface is also a low-training method of interacting with users. As hospitals, e.g., implement internet protocols to access and share data, presenting cardiac images on an internet browser is desirable.

A still further problem with existing technology is that resolution of cardiac images is not adequate to meet the bio-medical requirements of today. Single frame conversion of Dicomed formatted images at 128×128 resolution, as is the conventional limitation, must give way to better resolved imaging capabilities.

It is thus desired to have a readily accessible case record including a lossless image of the biomedical subject of examination by a physician. It is also desired to have video images for examination of dynamic biological functions, such as the beating of a human heart. It is understood that a solution for satisfying these desires will take into account the limited storage space of the image server to be utilized for storing the lossless stills and the dynamic video.

SUMMARY OF THE INVENTION

The present invention provides means to use HTTP and internet protocols to interface with, e.g., DICOM 3.0 XA image records. Dynamic video, or a Dynamic Thumbnail™, is generated and stored initially along with the complete case record on an image server in DICOM format, and particularly DICOM 3.0 XA format and/or an updated version thereof. The Dynamic Thumbnail™ is then accessible with a diagnostic viewer and/or an internet browser. Single lossless images are user selected and converted to HTTP format in real time for downloading by the browser. A low-bandwidth modem may be used to access the single image and/or Dynamic Thumbnail™ using the browser. When connected by a high speed network, e.g., 100 base-T, cases can be reviewed using "off-the-shelf" ACC/ACR-NEMA DICOM 3.0 XA exchange media (CD-R) format viewers as a plug-in to a standard browser.

The Dynamic Thumbnail™ and the user selected single lossless image are preferably stored together to form a post-diagnostic record of a medical case. Also, means for accessing the entire video from which the Dynamic Thumbnail™ and selected single images are derived is included in the case history, along with patient demographic and study textual information. The Dicom and HTTP formatted image (s) each have a high resolution capability. After a predetermined period of time has passed, the full case record is archived, leaving the single lossless still image and/or the Dynamic Thumbnail™, and the patient demographic and study textual information on the server. Preferably, patient demographic and study textual information, the Dynamic Thumbnail™, the lossless still image and means for accessing them are included in the post-diagnostic case history left behind when the complete case record is archived.

After another, far longer period of time has passed, the post-diagnostic case record is also archived automatically in accord with server storage space requirements. In this way, the post-diagnostic case record remains accessible on the server for a far longer period of time then it would be possible to store the complete case record, given storage space limitations.

In a preferred method of the invention, server accessible case records are generated for post-diagnostic and remote access viewing. First, a master sequence of digital video images is recorded. Next, a post-diagnostic case record is generated including a sequence of thumbnail images and a single lossless still image selected from the master sequence of images. The images of the post-diagnostic case record are formatted to be accessible by a browser over a dial-up connection. Each image of the sequence of thumbnail images includes a selection of interior pixels of one of the digital video images of the master sequence. The sequence of thumbnail images is a selection of consecutive images from the master sequence. The post-diagnostic case record and the master sequence are then each stored on an image server. The master sequence is archived onto a secondary archive medium after a predetermined time.

DETAILED DESCRIPTION OF THE PREFERRED EMBODIMENT

Figure 1:
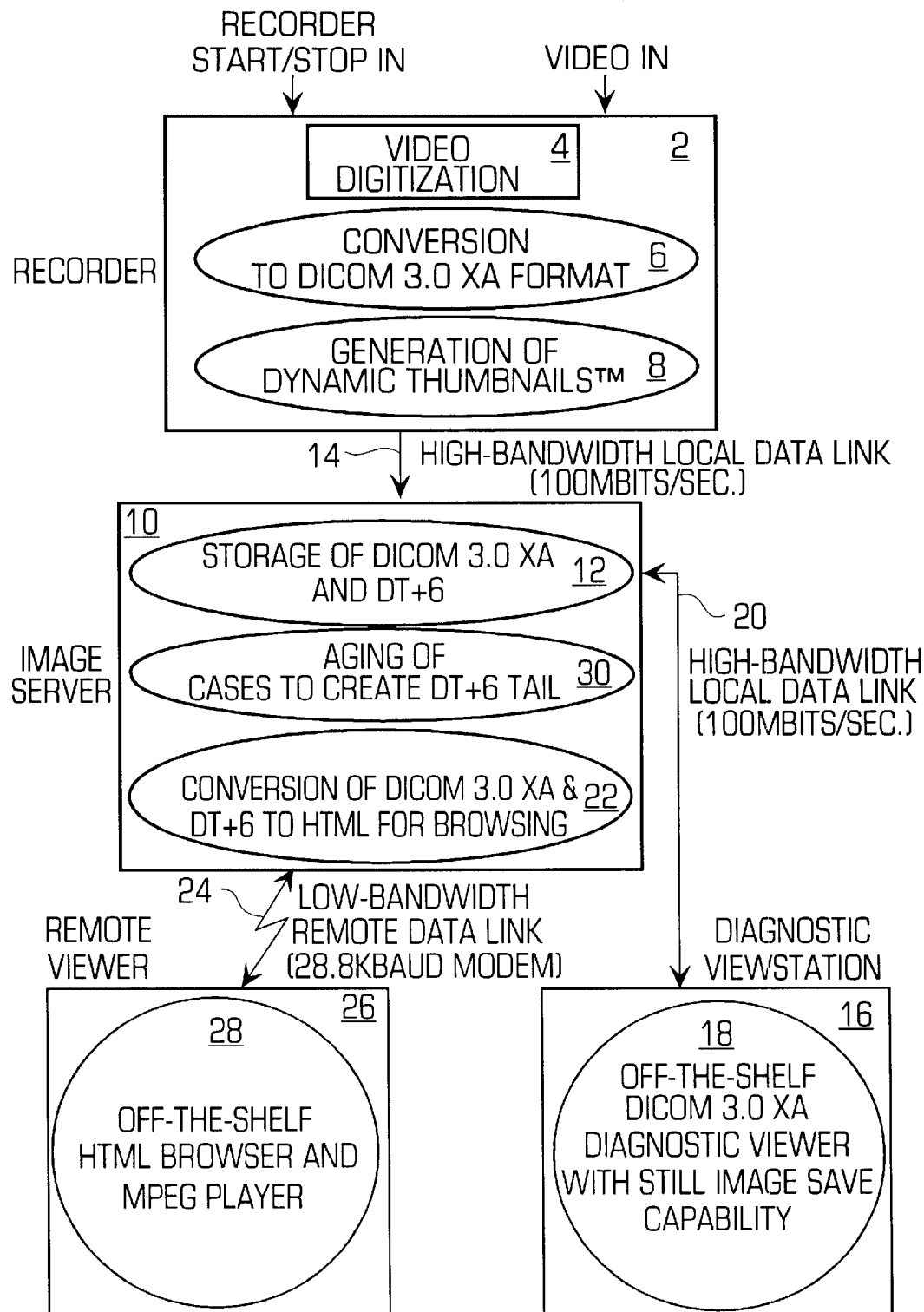
FIG. 1 is a block diagram illustrating the steps for taking a digital video recording and converting it into Dynamic Thumbnails™ and HTML viewable images for browsing.

FIG. 1 includes a series of major rectangular blocks which represent PC or workstation-class computers. Each workstation preferably includes a monitor, suitable input devices such as a keyboard and a mouse, and any data communication devices necessary to implement the data links shown in FIG. 1 and described in the specification. In FIG. 1, a minor rectangle within a major rectangle represents a further hardware component. The circles and ellipses represent software components.

Referring to FIG. 1, the present invention begins in a recorder workstation 2 represented by the first block having a video recorder 4 and a digital video recording of, for example, a series of cardiac images or angiograms. The images are preferably converted to Dicom 3.0 XA format, or specifically, to ACC/ACR-NEMA DICOM 3.0 exchange media, CD-Rom format by a first source code 6. Another format may be used in accord with the present invention which is readable by an appropriate and accessible diagnostic viewstation 16. The images preferably comprise 521×512 pixels, and may include 1024×512 pixels or any other suitable pixel arrangement.

A second source code 8, disclosed in the appendix and comprising a preferred embodiment of the present invention, entitled "compress.cpp" 8, generates a plurality of single thumbnail images of the original images forming a Dynamic Thumbnail™ or a video of the original images. Each of the Dynamic Thumbnail™ images in a preferred embodiment is 256×256 pixels, and may be further reduced to 240×240 pixels or may be 128×128 pixels or another pixel amount. Using compress.cpp 8, a group of DICOM formatted, thumbnail images, or a Dynamic Thumbnail™, is generated.

Compress.cpp 8 is a plug-in which converts ordinary video images from a video recorder into Dynamic Thumbnail™ images.

Dynamic Thumbnail™ images are an ISO standard MPEG-1 file (or video file) generated by taking, e.g., in a preferred embodiment, the middle fifteen frames, or one second of images, out of the center of a larger sequence of images. This one second of Dynamic Thumbnail™ images may contain a complete cardiac cycle. In an exemplary embodiment, a 521×512 pixel image is "properly" filtered using a two dimensional filter to 256×256 pixels. By properly filtering in this way, maximum resolution is maintained without creating any aliasing or artifacts. The outer eight pixels are eliminated creating an image which is 240×240 in resolution. This resolution and frame rate brings the video loop within the MPEG-1 definition of a constrained bit rate, which is the least common denominator MPEG-1 stream definition and the one any MPEG-1 viewer can play. The image quality is equal to or better than VHS tape resolution. Dynamic Thumbnails™ are prepared for storage on an image server 10, such as that represented by the second block.

The Dynamic Thumbnail™ video images, along with the original images in DICOM 3.0 XA format, are then stored on the image server 10 using a third source code 12. The Dynamic Thumbnail™ images are ordered one after another such that when ordered consecutively, they comprise a dynamic video of, for example, one beat of a human heart. An image server 10 upload 14 of graphic images from the recorder workstation 2 to the image server 10 utilizes a high bandwidth local data link having a transfer rate of, e.g., 100 Mbits/sec.

All images including the Dynamic Thumbnail™ images on the image server 10 are then accessible from a diagnostic viewstation 16 using an "off-the-shelf" HTTP multimedia MPEG viewer such as Sparkle for Macintosh, or Nettube, or Media Player for Windows. In this way, a user may be far away from the location of stored images and be viewing the images. A diagnostic server access transfer, wherein Dynamic Thumbnail™ images are retrieved from the image server 10, utilizes a high-bandwidth local data link 20. This data link 20 may have a transfer speed of, e.g., ethernet 100 Mbits/sec. The viewstation 16 is preferably equipped with compress.cpp 8 and is on a high speed connection such as 100 Base-T ethernet or 155 Mbps ATM. The viewstation 16 can then retrieve images from the image server 10 using the DICOM 3.0 XA exchange software 18 as a plug-in to a standard browser. Thus, the viewer at the viewstation 16 can view the Dynamic Thumbnail™ images or the original images using a standard internet browser.

The Dynamic Thumbnail™ images can also be viewed on a remote viewstation 26 through a public carrier access 24, for viewing by the user with an HTTP browser 28. The remote user need only have a low bandwidth remote data link such as with a 28.8 Kbaud modem, accessed through a public carrier, to perform the download 24.

Once the user views the Dynamic Thumbnail™ images, the user can select a desired single original image for further analysis by simply selecting the corresponding image from the Dynamic Thumbnail™ images. The image may be selected by the user from the diagnostic workstation. The image may also be selected by the user from a low bandwidth remote access data link. Once the image from the Dynamic Thumbnail™ images is selected, the program "getimage.cpp" 22 converts the corresponding original image in Dicom 3.0 XA format to HTML format and downloads the converted image over the link 20 or 24 for viewing by the diagnostic viewer 18 or the HTTP browser 28.

The remote viewstation 26 can be connected to a network with a dial-up modem connection. In this way, getimage.cpp 22 can provide the user with access to Dynamic Thumbnails™ or lossless images for diagnostic purposes, including the ability to zoom and pan.

The Dynamic Thumbnail™ images can be downloaded over a 28.8 Kbaud dial-up modem in less than a minute, and over an ISDN connection in less than ten seconds. Each image of the Dynamic Thumbnail™ images, accessible via diagnostic server access transfer 20 to the diagnostic workstation 16, or to the browser 28 via ordinary browser download 24, will provide greater resolution than the single thumbnail image accessible via ordinary low-bandwidth download 24 of the prior art. In addition, many useful applications are possible for lower image quality, yet web accessible, video images, particularly in the medical profession.

The Dynamic Thumbnail™ images occupy low space on a server 10, at about 90 Kbytes. Thus the original Dicom images may be transferred to a secondary archive medium for long term storage, leaving the Dynamic Thumbnail™ images on the server 10. In that event, a history of Dynamic Thumbnail™ images of different cases can be left for immediate access from the server 10. These Dynamic Thumbnail™ images are a useful tool for a health care worker to view and can provide sufficient information to answer his or her questions immediately. The images can suffice as a memory jogger for a busy health care worker and allow the health care worker to more fully recall a case once his or her memory has been refreshed. In any event, the health care worker always has the option of retrieving a full record for detailed review of any case from the long term digital archive.

A more complete diagnostic record is preferably provided when a selected full resolution lossless still image is saved along with the Dynamic Thumbnail™ in the case record kept on the image server 10. This post-diagnostic record including the Dynamic Thumbnail™ and the lossless still image advantageously requires far less storage space than the complete case record. The server space needed in the preferred embodiment is on the order of 1/100 of that needed for the complete case record. The still image or images to be kept along with the Dynamic Thumbnail™ in the post-diagnostic case record are typically selected by the physician reviewing the case using, e.g., a DICOM 3.0 viewstation or a web browser. The physician may select particular images based upon their diagnostic significance to the case.

Advantageously, when connected to a network with a dial-up (modem) connection, the present invention provides Dynamic Thumbnails™ plus one or a small number of selected still images from the case. The physician may be able to obtain enough information via the modem connection to consult on the case without having to travel to the hospital, e.g., to use the viewstation to consult the complete case.

Another advantage accompanies the 1/100th storage space requirement of the post-diagnostic case record provided by the present invention as opposed to that for the complete case record. The full length lossless recording of the case can only be retained for a short time, e.g., four weeks, due to online storage costs and other limitations. The reduced space required of the post-diagnostic case record provided by the present invention allows it to be retained for far longer, e.g., a year or more on the image server 10. By viewing a post-diagnostic case record stored on the server 10, which is older than four weeks, the physician may have no need to restore the full case record to the server 10, thereby reducing server storage and bandwidth requirements.

In fact, the Dynamic Thumbnail™/still image post-diagnostic case record combination occupies very little relative space on a disk based server 10 (e.g., 2 MB per case) compared with the complete case record (e.g., 200 MB per case). The present invention moves the full lossless case to a secondary archive medium, leaving the post-diagnostic case record behind on the server 10. Thus, a long history of post-diagnostic case records may be left on the server for immediate access. A doctor always has the option of recalling the full case from the secondary archive media if the post-diagnostic record is deemed to be insufficient for present analytic purposes.

The image quality of the Dynamic Thumbnail™, together with the diagnostic quality of the still images, provides sufficient visual data to refresh the memory of a doctor who is reviewing the case. The doctor may need a memory jogger when reviewing a case for a return visit by a patient or following a referral.

As another advantage, the Dynamic Thumbnails™ and the still image(s) saved in the post-diagnostic case record are small enough to download over a 28.8 Kb modem connection in typically less than one minute. Downloading may be performed in less than ten seconds when an ISDN connection is used. Dynamic images and lossless stills may thus be viewed from remote distances over the dial-up connection in real time.

The temporal and spatial resolution of the Dynamic Thumbnail™ images is such that a pentium based PC has sufficient processing power to decode the MPEG-1 image in real time, thus permitting viewing of images on most modern PC's including laptops. In a preferred embodiment, shortened MPEG-1 files for dynamic viewing are added to a directory which contains each DICOM directory file.

The present invention also provides further source code 30 for automatically archiving complete case records based on the storage requirements of the image server. As new studies are stored on the server, they are archived within a predetermined timeframe to off-line or near-line media, such as digital tape. As available on-line storage space fills up on the image server, the full-length lossless image sequences from the least recently accessed studies are caused to be removed from the server by the "agecases.cpp" 30 software of the present invention. Agecases 30 leaves the DICOMDIR, containing the patient demographic and study textual information, along with the Dynamic Thumbnails™ and selected diagnostic still images intact in on-line storage.

Advantageously, the physician may use the post-diagnostic record remaining on the server 10 after the full case record has been archived, or "aged-off" the server 10 by the agecases 30 software. A primary physician may find the post-diagnostic record to be useful, e.g., as a reference for a return visit by a patient, which may eliminate the need to restore the full study record from off-line or near-line archive media. A consulting physician may also review the post-diagnostic record remotely at any time, using low-cost, low-bandwidth remote access 24, such as with a modem or ISDN connection.

It is understood that the scope of the present invention is not limited to any of the examples or embodiments described above. It is intended that the appended claims alone define the scope of the invention.

We claim:

1. A method of preparing a sequence of digital video images for diagnostic and post-diagnostic viewing and of preparing a lossless still image for remote viewing by the internet browser, comprising the steps of:

recording a master sequence of digital images;

selecting a smaller sequence of images from said master sequence of images, each image of said smaller sequence comprising a portion of a corresponding image of said master sequence, said portion of each selected image being less than the entire corresponding image; and formatting the smaller sequence for viewing with the browser;

selecting an image from said master sequence of images;

formatting said image for lossless viewing by the browser; and storing the master sequence, the smaller sequence and the formatted image onto said image server.

2. The method of claim 1, further comprising the step of viewing said smaller sequence of images by a diagnostic viewer.

3. The method of claim 1, further comprising the step of viewing said smaller sequence of images by an internet browser.

4. The method of claim 3, wherein the formatting and storing step formats and stores the smaller sequence of images for viewing via said browser.

5. The method of claim 1, wherein the recording step includes the step of formatting said digital images of said master sequence into Dicomed format for viewing with a Dicom diagnostic viewer.

6. The method of claim 1, further comprising the step of archiving the master sequence off of the image server after a predetermined time.

7. The method of claim 1, further comprising the step of storing retrieving means for retrieving the archived master sequence onto said image server.

8. The method of claim 1, wherein the step of selecting the image for lossless viewing is performed via a low bandwidth remote access data link.

9. A method of generating and storing in a post diagnostic case record a sequence of digital video images and a lossless still image, comprising the steps of:

recording a master sequence of digital images;

selecting a smaller sequence of images from said master sequence of images, each image of said smaller sequence comprising a portion of a corresponding image of said master sequence, said portion of each selected image being less than the entire corresponding image;

formatting the smaller sequence for viewing with the browser;

selecting an image from said master sequence of images;

formatting said image for lossless viewing by the browser;

storing the master sequence, the smaller sequence and the formatted image onto said image server; and archiving the master sequence off of the image server after a predetermined time.

10. The method of claim 9, further comprising the step of viewing said smaller sequence of images by a diagnostic viewer.

11. The method of claim 9, further comprising the step of viewing said smaller sequence of images by an internet browser.

12. The method of claim 11, wherein the formatting and storing step formats and stores the smaller sequence of images for viewing via said browser.

13. The method of claim 9, wherein the recording step includes the step of formatting said digital images of said master sequence into Dicomed format for viewing with a Dicom diagnostic viewer.

14. The method of claim 9, further comprising the step of storing retrieving means for retrieving the archived master sequence along onto said image server.

15. A method of providing server accessible case records for post-diagnostic and remote access viewing, comprising the steps of:
   recording a first sequence of digital video images;
   generating a post-diagnostic case record including a second sequence of thumbnail images and a lossless still image from said first sequence of images, each thumbnail image of said second sequence including a selection of interior pixels of one of the digital video images of the first sequence, said second sequence including a selection of consecutive images from said first sequence; and
   storing said post-diagnostic case record and said first sequence on an image server.

16. The method of claim 15, further comprising the step of viewing said post-diagnostic case record by a diagnostic viewer.

17. The method of claim 15, further comprising the step of viewing said post-diagnostic case record by an internet browser.

18. The method of claim 17, wherein the storing step formats and stores the post-diagnostic case record for viewing via said internet browser.

19. The method of claim 15, further comprising the step of archiving said first sequence onto a secondary archive medium after a predetermined time.

20. The method of claim 15, wherein said generating step includes formatting the images of the post-diagnostic case record to be accessible by a browser, the method further comprising the step of accessing said post-diagnostic case record using said browser.

21. The method of claim 20, wherein said accessing step is performed over a dial-up connection.

22. An apparatus for generating and storing in a post diagnostic case record a sequence of digital video images and a single lossless still image, comprising:
   means for recording a master sequence of digital images;
   means for selecting a smaller sequence of images from said master sequence of images, each image of said smaller sequence comprising a portion of a corresponding image of said master sequence, said portion of each selected image being less than the entire corresponding image,
   means for formatting the smaller sequence for viewing with the browser;
   means for storing the master sequence and the smaller sequence onto an image server;
   means for selecting an image from said master sequence of images;
   means for formatting said image for lossless viewing by the browser; and
   means for storing the lossless image onto the server along with the smaller sequence and master sequence.

23. A recording medium readable by an information processing apparatus, tangibly embodying a program of instructions executable by the information processing apparatus to perform method steps for generating and storing in a post diagnostic case record a sequence of digital video images and a single lossless still image, said method steps comprising:
   recording a master sequence of digital images;
   selecting a smaller sequence of images from said master sequence of images, each image of said smaller sequence comprising a portion of a corresponding image of said master sequence, said portion of each selected image being less than the entire corresponding image;
   formatting the smaller sequence for viewing with the browser,
   wherein the program of instructions is further executable by the information processing apparatus for performing the steps of:
   selecting an image from said master sequence of images;
   formatting said image for lossless viewing by the browser; and
   storing the lossless image onto the image server along with the master sequence and the smaller sequence.

24. An article of manufacturing comprising;
   a computer useable medium having computer readable program code embodied therein configured to provide server accessible case records for post-diagnostic and remote access viewing, the computer readable program code comprising;
   computer readable program code configured to cause the computer to record a first sequence of digital video images;
   computer readable program code configured to cause the computer to generate a post-diagnostic case record including a second sequence of thumbnail images and a lossless still image from said first sequence of images, each thumbnail image of said second sequence including a selection of interior pixels of one of the digital video images of the first sequence, said second sequence including a selection of consecutive images from said first sequence; and
   computer readable program code configured to cause the computer to store said post-diagnostic case record in said first sequence on an image server.

25. The article of manufacture of claim 24 further comprising computer readable program code configured to cause the computer to control a diagnostic viewer to view said post-diagnostic case record.

26. The article of manufacture of claim 24 further comprising computer readable program code configured to cause the computer to control an internet browser to view said post-diagnostic case record.

27. The article of manufacture of claim 26, wherein the computer readable program code configured to cause the computer to store is further configured to cause the computer to format and store the post-diagnostic case record for viewing via said internet browser.

28. The article of manufacture of claim 24 further comprising computer readable program code configured to cause the computer to archive said first sequence onto a secondary archive medium after a predetermined time.

29. The article of manufacture of claim 24 wherein said computer readable program code configured to cause the computer to generate further includes computer readable program code configured to cause the computer to format the images of the post-diagnostic case record to be accessible by a browser, and the computer readable program code in said article of manufacture further comprising computer readable program code configured to cause the computer to control said internet browser to access said post-diagnostic case record.

30. The article of manufacture of claim 29 wherein said access by said browser is performed over a dial-up connection.

31. A recording and viewing system comprising:
   a recorder storing a first sequence of digital video images and generating a post-diagnostic case record including a second sequence of thumbnail images and a lossless still image from said first sequence of images, each thumbnail image of said second sequence including a selection of interior pixels of one of the digital video images of the first sequence, said second sequence including a selection of consecutive images from said first sequence; and
   an image server storing said post-diagnostic case record in said first sequence.

32. The recording and viewing system of claim 31 wherein the image server provides the post-diagnostic case record to a diagnostic viewer.

33. The recording and viewing system of claim 31 wherein the image server provides the post-diagnostic case record to an internet browser.

34. The recording and viewing system of claim 33 wherein the image server formats and stores the post-diagnostic case record for viewing via the internet browser.

35. The recording and viewing system of claim 31 wherein the image server provides the first sequence after a predetermined time to a secondary archive medium for storing therein.

36. The recording and viewing system of claim 32 wherein the recorder formats the images of the post-diagnostic case record for access by a browser and the browser accesses said post-diagnostic case record.

37. The recording and viewing system of claim 36 wherein the image server includes a dial up connection for accessing by the internet browser.

38. A system for providing server accessible case records for post-diagnostic and remote access viewing, comprising:
   means for recording a first sequence of digital video images;
   means for generating a post-diagnostic case record including a second sequence of thumbnail images and a lossless still image from said first sequence of images, each thumbnail image of said second sequence including a selection of interior pixels of one of the digital video images of the first sequence, said second sequence including a selection of consecutive images from said first sequence; and
   means storing said post-diagnostic case record and said first sequence on an image server.

* * * * *